I. J. NELSON.
SLEIGH RUNNER.
APPLICATION FILED APR. 23, 1917.

1,267,789.

Patented May 28, 1918.

WITNESSES

INVENTOR
Iver J. Nelson

BY

ATTORNEY

UNITED STATES PATENT OFFICE.

IVER J. NELSON, OF WITTENBERG, WISCONSIN.

SLEIGH-RUNNER.

1,267,789.   Specification of Letters Patent.   Patented May 28, 1918.

Application filed April 23, 1917. Serial No. 163,971.

*To all whom it may concern:*

Be it known that I, IVER J. NELSON, a citizen of the United States, residing at Wittenberg, in the county of Shawano and State of Wisconsin, have invented certain new and useful Improvements in Sleigh-Runners, of which the following is a specification.

This invention relates to sleigh runners, and it more particularly relates to the class of runners which are attachable to vehicle wheels.

One of the objects of this invention is to provide a device of this character which may be very quickly and easily applied to a vehicle wheel.

Another object of the invention is to provide a device of this character which, when applied to a vehicle wheel, will remain securely attached thereto until purposely removed.

Another object is to provide a sleigh runner of this character, on which the vehicle may be easily backed and easily turned.

Another object is to provide a device of this character which is of such simple construction as to minimize the cost of manufacture.

And another object is to provide a device of this character which comprises a comparatively small number of parts, thereby minimizing the probability of the device getting out of repair.

Figure 1:
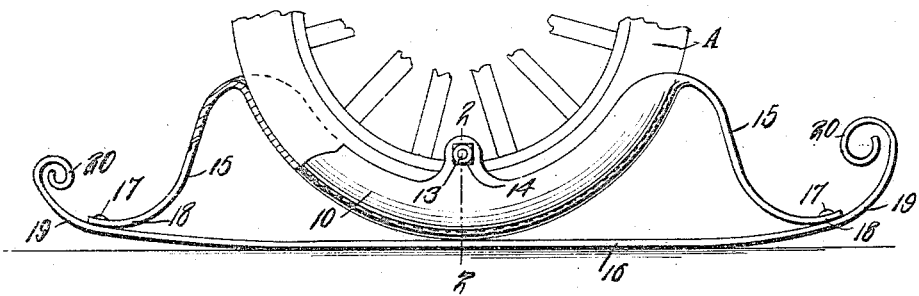
Figure 2:
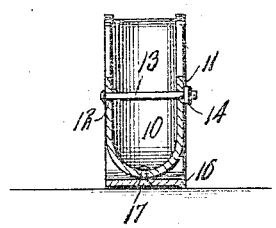

Other objects and advantages will appear to persons who read the following detail description, in connection with the appended drawings, in which:

Figure 1 represents a fragmentary portion of an automobile wheel and tire in connection with one embodiment of my invention shown in side elevation, a portion of the wheel-seat being broken away; and Fig. 2 is a vertical sectional view taken on the line 2—2 of Fig. 1.

Referring to the drawing in detail, in which similar reference characters correspond with similar parts throughout both views, the reference character 10 designates generally the concavo-convexed wheel-seat which is provided with upstanding apertured ears 11, through the apertures 12 of which extends a bolt 13 having a nut 14 in screw-threaded engagement with one end thereof.

Formed integrally with the wheel-seat 10 is a pair of brace elements 15, each extending substantially in a radial direction from the center of longitudinal curvature of the element 10, these braces 15 being each preferably formed along a compound curve.

The central and lower portion of the wheel-seat 10 rests upon a shoe or runner bar 16, and is secured thereto by means of a bolt or rivet 17. Other rivets or bolts 17 are employed for securing the end portions 18, of the braces 15, to the end portions 19 of the shoe 16; said end portions 19 being upwardly curved and each terminating in a scroll 20.

The shoe 16 is preferably rectilinear from its middle portion to a point approximately in perpendicular alinement with the front and rear extremities of the wheel A and with the terminals of the wheel-seat 10, where the braces 15 unite therewith; the said braces being secured substantially midway between the rectilinear portion of the shoe 16 and the scroll 20. By this arrangement, it is obvious that the runner has a considerable amount of resiliency, because the device is formed almost entirely of somewhat resilient sheet metal, and because of the curved elements 15 being secured to a curved portion of the shoe 16 and thereby holding the point of connection, at 17, spaced above the ground or road upon which the runner travels.

The combined wheel-seat and brace, which consists of the elements 10 and 15, is preferably formed by pressing a blank of sheet metal into the form illustrated, thereby providing a device of great tenacity, and at a comparatively slight cost.

From the foregoing, it will be seen that I have provided a device of this character which is of great utility and which is believed to be destined to a high degree of commercial success and to become very popular as a means for converting a rolling-vehicle into a sliding-vehicle.

I claim:

A sleigh attachment for vehicle wheels, comprising a runner consisting of a resilient bar having its opposite end portions curved upwardly, a sheet metal blank having its medial portion widened and longitudinally and transversely curved to form a wheel seat which is secured centrally to the runner, and having its opposite end portions reversely curved to form spring braces which are attached at their lower ends to the upwardly curved end portions of the runner.

In testimony whereof I affix my signature in presence of two witnesses.

IVER J. NELSON.

Witnesses:
GEO. F. GATES,
T. T. JACOBSON.

Copies of this patent may be obtained for five cents each, by addressing the "Commissioner of Patents, Washington, D. C."